United States Patent
Gao et al.

(10) Patent No.: US 11,586,663 B2
(45) Date of Patent: *Feb. 21, 2023

(54) CROSS-PLATFORM CONTENT MUTING

(71) Applicant: Google LLC, Mountain View, CA (US)

(72) Inventors: Yian Gao, Sunnyvale, CA (US); Gang Wang, Jersey City, NJ (US); Marcel M. Moti Yung, New York, NY (US); Suneeti Shah, Mountain View, CA (US); Philippe de Lurand Pierre-Paul, San Jose, CA (US); Creighton Thomas, Maplewood, NJ (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/534,065

(22) Filed: Nov. 23, 2021

(65) Prior Publication Data

US 2022/0083582 A1  Mar. 17, 2022

Related U.S. Application Data

(63) Continuation of application No. 16/661,524, filed on Oct. 23, 2019, now Pat. No. 11,210,331, which is a
(Continued)

(51) Int. Cl.
*G06F 16/41* (2019.01)
*G06F 16/45* (2019.01)
(Continued)

(52) U.S. Cl.
CPC .............. *G06F 16/41* (2019.01); *G06F 3/165* (2013.01); *G06F 16/45* (2019.01); *G06F 16/483* (2019.01); *G06V 30/153* (2022.01)

(58) Field of Classification Search
CPC ......... G06F 16/41; G06F 16/45; G06F 16/483
(Continued)

(56) References Cited

U.S. PATENT DOCUMENTS 8,868,689 B1  10/2014  Khanna et al.
9,280,742 B1  3/2016  Sargin et al.
(Continued)

FOREIGN PATENT DOCUMENTS

CN  102714050  10/2012
CN  104935651  9/2015
(Continued)

OTHER PUBLICATIONS

Breen et al., "Image classification using neural networks and ontologies," Database and Expert Systems Applications, Sep. 2002, 5 pages.
(Continued)

*Primary Examiner* — Kimberly L Wilson
(74) *Attorney, Agent, or Firm* — Fish & Richardson P.C.

(57) ABSTRACT

Methods, systems, and apparatus, including computer programs encoded on a computer storage medium, facilitate cross-platform content muting. Methods include detecting a request from a user to remove, from a user interface, a media item that is provided by a first content source and presented on a first platform. One or more tags that represent the media item are determined. These tags, which indicate that the user removed the media item represented by the one or more tags from presentation on the first platform, are stored in a storage device. Subsequently, content provided by a second content source (different from the first content source) on a second platform (different from the first platform) is prevented from being presented. This content is prevented from being presented based on a tag representing the content matching the one or more tags stored in the storage device.

20 Claims, 4 Drawing Sheets

Related U.S. Application Data continuation of application No. PCT/US2019/033863, filed on May 23, 2019.

(51) Int. Cl.
  *G06F 16/483* (2019.01)
  *G06F 3/16* (2006.01)
  *G06V 30/148* (2022.01)

(58) Field of Classification Search
  USPC .......................................................... 707/741
  See application file for complete search history.

(56) References Cited

U.S. PATENT DOCUMENTS

| | | | |
|---|---|---|---|
| 10,003,836 | B2 | 6/2018 | Carmichael et al. |
| 10,182,261 | B2 | 1/2019 | Vinson et al. |
| 10,222,942 | B1 | 3/2019 | Zeiler et al. |
| 2003/0055722 | A1 | 3/2003 | Perreault et al. |
| 2005/0209874 | A1 | 9/2005 | Rossini |
| 2011/0113466 | A1 | 5/2011 | Stringham et al. |
| 2012/0278428 | A1 | 11/2012 | Harrison et al. |
| 2014/0074855 | A1 | 3/2014 | Zhao et al. |
| 2016/0316238 | A1 | 10/2016 | Carmichael et al. |
| 2016/0316268 | A1 | 10/2016 | Carmichael et al. |
| 2017/0085962 | A1 | 3/2017 | Maughan et al. |
| 2018/0098101 | A1 | 4/2018 | Pont et al. |
| 2018/0240023 | A1* | 8/2018 | Ivanov .............. G06F 16/24578 |
| 2019/0087435 | A1 | 3/2019 | Katardjiev et al. |

FOREIGN PATENT DOCUMENTS

| | | |
|---|---|---|
| CN | 105468695 | 4/2016 |
| CN | 105960640 | 9/2016 |
| CN | 107027327 | 8/2017 |
| CN | 109617999 | 4/2019 |
| JP | 2003-242410 | 8/2003 |
| JP | 2006-195974 | 7/2006 |
| JP | 2017-041239 | 2/2017 |
| WO | WO 2015/143956 | 10/2015 |
| WO | WO 2017/030281 | 2/2017 |

OTHER PUBLICATIONS

International Search Report and Written Opinion in International Appln. No. PCT/US2019/033863, dated Nov. 8, 2019, 22 pages.

Park et al., "Content-based image classification using a neural network," Pattern Recognition Letters, Feb. 2004, 14 pages.

Wu et al., "TextFinder: An Automatic System to Detect and Recognize Text In Images," IEEE Transactions on Pattern Analysis and Machine Intelligence, Nov. 1999, 6 pages.

Zhang et al., "Kill Two Birds with One Stone, Weakly-Supervised Neural Network for Image Annotation and Tag Refinement," arXiv, Nov. 2017, 8 pages.

Notice of Allowance in Japanese Appln. No. 2021-569166, dated Jun. 27, 2022, 5 pages (with English translation).

Office Action in Chinese Appln. No. 201980095622.8, dated May 25, 2022, 23 pages (with English translation).

Office Action in Chinese Appln. No. 201980095622.8, dated Aug. 30, 2022, 5 pages (with English search report).

\* cited by examiner

CROSS-PLATFORM CONTENT MUTING

CROSS-REFERENCE TO RELATED APPLICATION

This application is a continuation application of, and claims priority to, U.S. patent application Ser. No. 16/661,524, filed Oct. 23, 2019, which is a continuation of PCT Application No. PCT/US2019/033863, filed May 23, 2019, the contents of each are herein incorporated by reference.

BACKGROUND

This specification relates to cross-platform content muting.

A user can access content (e.g., news, music, social media) on multiple different content platforms (e.g., search engines, social media platforms, news platforms, data aggregator platforms, etc.). The content on each content platform can be provided by a single content source or by multiple different content sources. In some instances, the same type of content (or even the same item of content) may be provided by different content sources on the same or different content platforms.

SUMMARY

In general, one innovative aspect of the subject matter described in this specification can be embodied in methods detecting, by a data processing apparatus, a request from a user to remove, from a user interface, a media item that is provided by a first content source and presented on a first platform; determining, by the data processing apparatus, one or more tags that represent the media item; storing, by the data processing apparatus and in a storage device, the one or more tags indicating that the user removed the media item represented by the one or more tags from presentation on the first platform; and preventing, by the data processing apparatus, presentation of content provided by a second content source on a second platform that differs from the first platform, wherein presentation of the content provided by the second content source is prevented based on a tag representing the content matching the one or more tags stored in the storage device, and wherein the second content source differs from the first content source. Other embodiments of this aspect include corresponding systems, devices, apparatus, and computer programs configured to perform the actions of the methods. The computer programs (e.g., instructions) can be encoded on computer storage devices. These and other embodiments can each optionally include one or more of the following features.

Determining, by the data processing apparatus, one or more tags that represent the media item, can include extracting, from the media item, features of the media item; and processing the features to identify one or more tags that represent the media item from among tags listed in a reference hierarchical classification structure.

Processing the features to identify one or more tags that represent the media item from among tags listed in a reference hierarchical classification structure, can include generating labels to represent the media item based on the features of the media item; and identifying the one or more tags that represent the media item based on a comparison of the labels to tags listed in the reference hierarchical classification structure.

Methods can include detecting execution of a script on a second content platform that requests content from the second content source; after detecting execution of the script, transmitting a request to the second content source to provide content other than content having the one or more tags, wherein the request includes the one or more tags stored in the storage device; and after transmitting the request to the second content source, receiving content provided by the second content source.

Methods can include confirming that tags representing the content provided by the second content source do not match the one or more tags that represent the media item; and allowing presentation of the content provided by the second content source after confirming that the tags representing the content provided by the second content source do not match the one or more tags that represent the media item.

Confirming that tags representing the content provided by the second content source do not match the one or more tags that represent the media item, can include extracting, by the data processing apparatus and from the content provided by the second content source, features related to the content provided by the content source; processing, by the data processing apparatus, the features to identify one or more tags for the content provided by the second content source from among tags listed in a reference hierarchical classification structure; and determining, by the data processing apparatus, that the one or more tags for the content provided by the second content source does not match the one or more tags that represent the media item.

Methods can include determining, by the data processing apparatus, a number of instances when the data processing apparatus prevented presentation of the content provided by the second content source; determining, by the data processing apparatus, that the number of instances satisfies a rejection threshold; and in response to determining that the number of instances satisfies the rejection threshold, preventing presentation of any content provided by the second content source.

Particular embodiments of the subject matter described in this specification can be implemented to realize one or more of the following advantages. For example, the innovations described in this specification enable a user to exercise control over the content that is provided to them by multiple different content sources and/or content platforms. This, in turn, can facilitate improved user experience and user engagement across those content sources and/or content platforms. Conventional systems did not include the ability to prevent presentation of the same or similar media item provided by multiple different content sources or content platforms. This negatively affected user experience across content platforms because a user may be frustrated to be presented with content that he/she has previously removed when provided by a different content source and/or content platform. In such conventional systems, a user may prevent repeated presentation of content that he/she has already removed, e.g., the user ignoring the content (e.g., by scrolling to a different media item), switching to a different platform, or blocking all content from any content source (e.g., by using a content blocking web browser plugin). In contrast, the innovations described in this specification allow a user to control the content that is provided by multiple different content sources and/or multiple different content platforms because they prevent presentation of content—provided by any content source on any content platform—that is the same as or similar to the media item/s that the user has previously requested to remove.

The innovations described in this specification also facilitate interoperability between disparate and/or unrelated content sources, content managers (which may be an agent running on the user devices, as further described in this specification), and content platforms. Without a common tag schema, different content sources, content managers, and content platforms may classify content differently. Thus, for example, if a user requests to remove content provided by one content source, that content source may assign tags that are different from the tags that would be assigned by other content sources. As a result, the other content sources may not accurately and consistently filter out the types of content that the user has previously requested to remove. In contrast, the innovations described in this specification specify that a common tag schema be used by the content sources, content managers, and content platforms, and also facilitate the exchange of information across platforms so as to enable various different content platforms to utilize content block requests that users have initiated on any of the various different content platforms. This ensures that a content source, content manager, or a content platform may accurately and consistently filter out or remove the types of content that the user has previously requested to remove.

The innovations described in this specification also facilitate user privacy. In some instances, tags for content that the user has previously requested to remove may be sent to a content source along with a request for content. The innovations described in this specification enable maintaining privacy with respect to the user's preferences in various ways. First, the innovations described in this specification can maintain all the tags at the user device and then use these tags to filter out any content received from a content source. This ensures that the tags associated with a user are not sent to a content source, and thus removes the possibility of a user being uniquely identified by his/her tags. Second, the innovations described in this specification anonymize the user's tags by only sending those tags to a content source that are associated with a threshold number of other users. Thus, although this approach sends a user's tags to a content source, those tags are also associated with a significant number of other users, which reduces the ability of content sources or other entities to discern unique information about a user or to uniquely identify a user by his/her tags.

Moreover, the innovations described in this specification enable improved user engagement and retention on content platforms. This is because, by preventing presentation of content that is the same as or similar to media items that the user has previously removed, the content that is provided to the user is more tailored to the user's preferences despite which content source previously provided the content that was removed by the user. This in turn enables content platforms to retain and grow users accessing and participating in their platforms.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification relates to cross-platform content muting.

A user can access content (which may also be referred to herein as media items, and may include e.g., news, music, social media) on multiple different content platforms (e.g., search engines, social media platforms, news platforms, data aggregator platforms, etc.). In general, a content platform can be any computer (e.g., a server) or service (e.g., a web service) through which a user can access content. A content platform may be accessed via a website and/or a native application (e.g., a native application for a mobile device or other computing device), or in any other suitable manner. The content on each content platform can be provided by one or more content sources. As used in this specification, a content source includes servers, repositories, or other storage devices that store content generated and/or published by one or more entities and that provide content to content platforms and/or user devices in response to requests for content from these entities. In some instances, the same type of content may be provided by different content sources on the same or different content platforms. For example, a social media platform may present content provided by two different content sources, both of which provide information about the same minivan. As another example, a social media platform may present media items about a minivan that are provided by one content source and a news platform may present media items about the same minivan that are provided by a different content source.

A user may request to remove, from a user interface of a user device, a media item provided by one content source for presentation on one content platform. The user's request to remove a media item provides an indication to the content platform, the user device, and/or the content source that the user is not interested in seeing the media item. A request to remove a media item may result in any of the following actions by the content platform and/or the user device: (1) prevent further presentation of the media item (e.g., pause or mute a video or audio); (2) replace the media item with another media item requested from the same or different content source; and (3) replace the media item with a blank box or other display element that hides the media item from display.

As described below and in greater detail throughout this specification, a user's request to remove a media item is also used by the innovations described in this specification to prevent subsequent presentation of similar types of content provided by any content source on any content platform.

A content manager, which in some implementations is an agent running on a user device, can detect a user's request to remove, from a user interface of the user device, a media item provided by a first content source for presentation on a first content platform. The content manager processes the media item, which may include extracting features (e.g., using image processing, optical character recognition, or machine learning techniques) from the media item and generating labels that represent the media item. Based on this processing, the content manager identifies one or more tags for the media item from among tags listed in a hierarchical classification structure. These tags indicate the type of content that the user has requested to remove from presentation on the first platform. The content manager stores these tags in a storage device.

The content manager uses these stored tags to prevent presentation of other content—provided by any content source for presentation on any content platform—that is also represented by one or more of these stored tags. Thus, if the user device requests content from another content source (i.e., different from the first content source) for presentation on another content platform (i.e., different from the first content platform), the content manager can send the stored tags to that content source. In response, the content source can send content, which is represented by tags other than any of the tags sent to the content source. Alternatively, or additionally, the content manager can analyze the content received from the content source to determine whether any of the received content is represented by any of the tags sent to the content source. If the received content is represented by one or more of these tags, the content manager can prevent presentation of this content on the user device. On the other hand, if the received content is not represented by any of the stored tags, the content manager allows presentation of this content on the user device.

These features and additional features are described in more detail below with reference to FIGS. 1-4.

Further to the descriptions throughout this document, a user may be provided with controls allowing the user to make an election as to both if and when systems, programs, or features described herein may enable collection of user information (e.g., information about a user's social network, social actions, or activities, profession, a user's preferences, or a user's current location), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Figure 1:
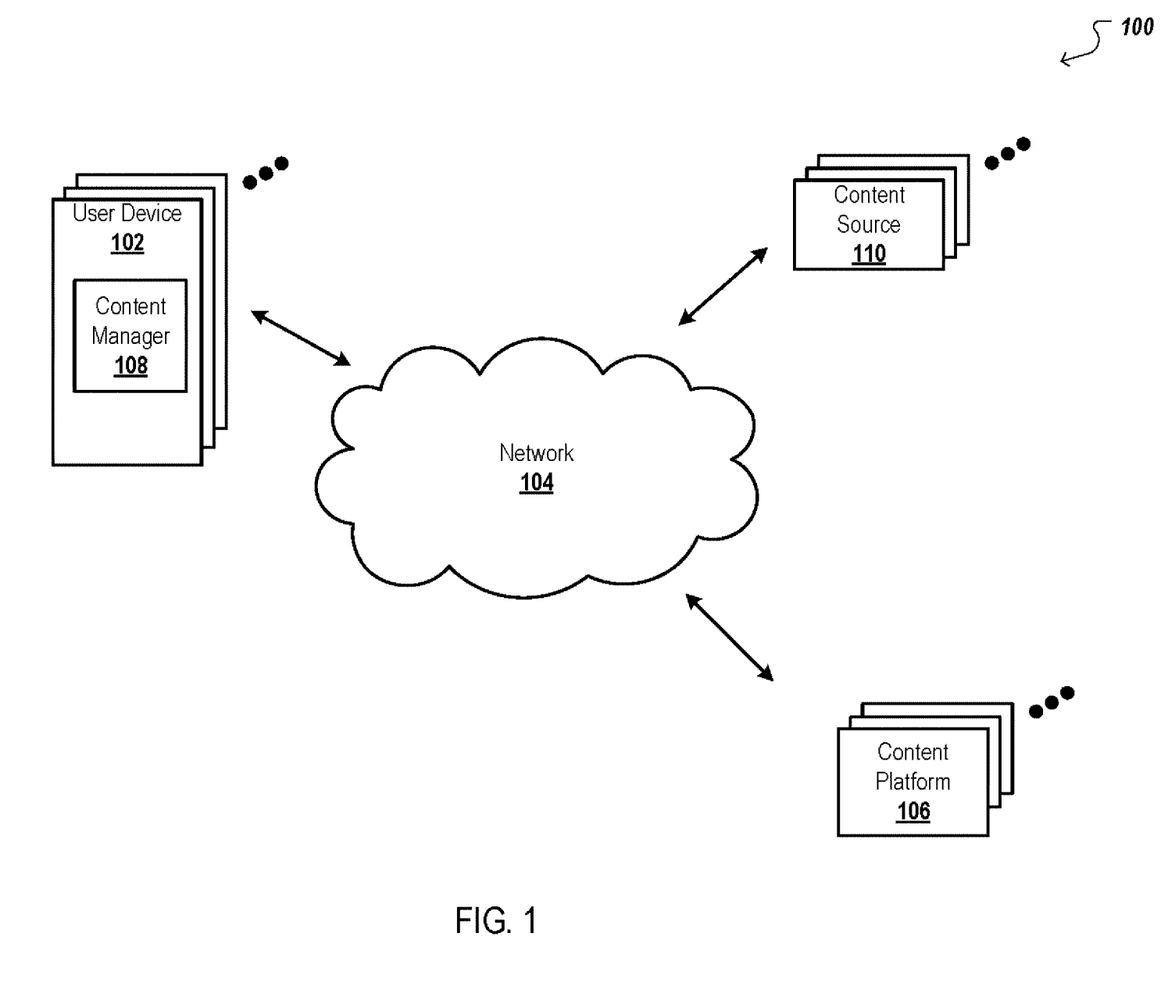
FIG. 1 is a block diagram of an example environment in which content is distributed for presentation.

FIG. 1 is a block diagram of an example environment 100 in which content is distributed for presentation. The example environment 100 includes a network 104, such as a local area network (LAN), a wide area network (WAN), the Internet, or a combination thereof. The network 104 connects user devices 102, platforms 106, and content sources 110. The example environment 100 may include many different content sources 110, platforms 106, and user devices 102.

A user device 102 is an electronic device that is capable of requesting and receiving content over the network 104. Example user devices 102 include personal computers, mobile communication devices, digital assistant devices, and other devices that can send and receive data over the network 104. A user device 102 typically includes a user application, such as a web browser, to facilitate the sending and receiving of data over the network 104, but native applications executed by the user device 102 can also facilitate the sending and receiving of content over the network 104. Examples of content presented at a user device 102 include webpages, word processing documents, portable document format (PDF) documents, images, videos, and search results pages.

A content platform 106 is a computing platform that enables distribution of content. Example content platforms 106 include search engines, social media platforms, news platforms, data aggregator platforms, or other content sharing platforms. Each content platform 106 may be operated by a content platform service provider.

The content platform 106 may publish and make available on the platform, its own content. For example, the content platform 106 may be a news platform, which publishes its own news articles. The content platform 106 may also present content provided by one or more content sources 110. In the above example, the news platform may also present content created by different authors and provided by one or more content sources 110. As another example, the content platform 106 may be a data aggregator platform that does not publish any of its own content, but aggregates and presents news articles provided by different news websites (i.e., content sources 110).

A user using an application (e.g., a web browser) on a user device 102 can access and retrieve content presented on a content platform 106. As described below with reference to FIGS. 2 and 3, a user can specify media items presented on the content platform 106 in which the user is not interested, which in turn enables a content manager 108 to prevent the same or similar content—by the same or different content source 110—to be presented to the user on any content platform 106.

Figure 2:
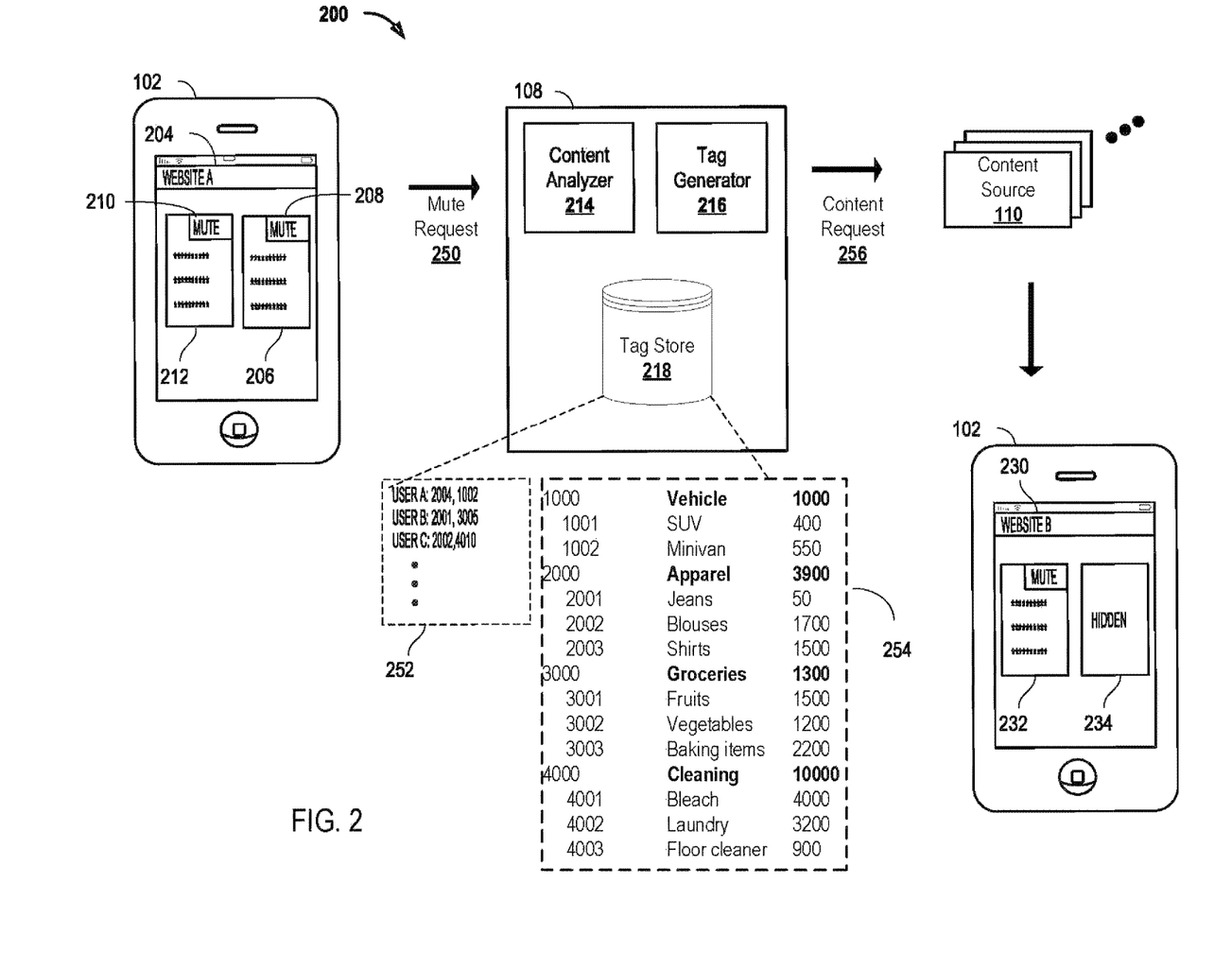
FIG. 2 is a block diagram that illustrates the structure and operations of the content manager in preventing presentation of media items that the user has previously requested to remove.

FIG. 2 is a block diagram that illustrates the structure and operation of the content manager that prevents presentation of content based on user preferences.

As depicted in FIG. 2, a user using user device 102 (e.g., a mobile device) accesses the website of an example content platform, Website A 204. For example, Website A 204 may be a news aggregator platform that presents news articles that are provided by different content sources 110. As another example, Website A 204 may be a social media platform that presents media items provided by one or more content sources 110. As depicted in FIG. 2, the example content platform 204 presents content, including media items 212 and 206, from one or more content sources 110. Media items 212 and 206 may be any type of audio, video, or text content.

If the user of the user device 102 is not interested in a particular media item presented on a content platform 106, the user can express that intent by selecting on the interface (e.g., by pressing his/her finger on the touch sensitive screen of the user device 102) a mute button, which is generally located in one corner of the media item. For example, the user may express that it is not interested in media item 206 by pressing the mute button 208 present in the top right corner of media item 206. Alternatively, instead of a mute button, the content platform 106 may present any other type of interactive graphical user interface (GUI) component (e.g., radio buttons, drop downs) associated with a particular media item that the user may select to express that it is not interested in the media item.

The user's selection of the mute button (or any other interactive GUI component with which the user interacts to specify that it is not interested in a media item) generates a mute request 250, which is transmitted to the content manager 108. In some implementations, the content manager 108 is implemented as an agent running with the browser (or other application) that the user is using to view the content on the content platform 106. In such implementations, the user's selection of the mute button (or other interactive GUI component, as described above) invokes an application programming interface (API) of the browser, which transmits the user's mute request 250 to the content manager 108.

As described in the following paragraphs, upon receiving the mute request 250, the content manager 108 begins processing the media item for which the mute button was pressed (for ease of reference, this media item will hereafter referred to as the selected media item).

The content manager 108 analyzes the selected media item and based on this analysis, determines one or more tags that represent the media item. This is performed by the components of the content manager 108, which include a content analyzer 214, a tag generator 216, and tag store 218. Although FIG. 2 depicts the content manager as having these three components, the content manager 108 may have fewer or more components that perform the operations described below.

The content analyzer 214 analyzes the selected media item to extract features from this media item. As used in this specification, features of a media item include attributes that identify entities, objects, shapes, text, or colors in the selected media item.

In some implementations, the content analyzer 214 may include an image processing engine that identifies features, such as shapes, colors, and objects, within images contained in the selected media item. The image processing engine may be a rules-based engine that uses stored shapes and objects to identify the same or similar shapes and objects in the selected media item. Alternatively, or in addition, the image processing engine may use artificial intelligence techniques, such as neural networks or other machine learning techniques, that have been trained using a set of training images to identify shapes, colors, and objects present within an image. The image processing engine may also assign labels to the shapes, colors, and objects identified within the image. For example, if the image processing engine identifies a blue minivan in an image, the image processing engine may generate labels like "blue," "minivan," and "vehicle."

The image processing engine may also generate these labels as part of the rules-based or neural network analysis. In either case, the image processing engine has stored shapes, colors, and objects (i.e., the reference shapes/objects used in a rules-based analysis or the shapes/colors/objects used during training of the neural network), each of which may be assigned a label. Upon finding a matching shape, color, or object in an image, the image processing engine assigns these labels to the matched shapes/objects.

Additionally, or alternatively, the content analyzer 214 may include an optical character recognition (OCR) engine that detects and extracts text from the selected media item. In the above example, the OCR engine may detect and extract text located on the minivan (e.g., the brand or model of the minivan) or from any content surrounding the image of the minivan shown in the selected media (e.g., the specifications of the minivan, such as engine type, number of possible passengers, etc.).

The OCR engine may also assign labels to the extracted text. In some instances, the extracted text may itself be a label. For example, if the extracted text is a name of a car model, the label may also be the name of the car model. In other instances, the OCR engine may process the extracted text to assign it labels. For example, the OCR engine may use text such as "vehicle" and "seven passenger" to determine a label of "minivan." The OCR engine may perform such processing using a rules-based engine, which stores rules about how different text features correlate or map to particular labels. Alternatively, or additionally, the OCR engine may perform such processing using artificial engine techniques, such as unsupervised or supervised machine learning, to determine the appropriate labels for different text features.

Additionally, or alternatively, the content analyzer 214 may include a machine learning engine. The machine learning engine may be trained using a set of media items, the features actually extracted from these media items. In some implementations, the machine learning engine may also be trained using the labels for the media item. The selected media item may be input to the machine learning engine, which then outputs the features of the media item and in some implementations, the labels.

Based on the extracted features and labels identified by the content analyzer 214, the tag generator 216 generates tags for the selected media item. In some implementations, the tag generator 216 generates tags based on a comparison of the labels with tags listed in a hierarchical classification structure, such as the example tag schema 254. As depicted using the example tag schema 254, a hierarchical classification structure (which will also be referred to in this specification as a tag schema) includes a hierarchy of tags that may be used to represent or classify content of the selected media item. The tag schema 254 is stored in a data structure within the tag store data storage device 218. Although the tag schema 254 only includes two levels in the hierarchy (e.g., an X000 level and sub-tags below each such level), the tag schema can include more than two levels in the hierarchical classification. The content sources 110, content manager 108, and content platforms 106, maintain the same tag schema, an example of which is shown in data structure 252.

If the tag generator 216 finds textual matches for one or more labels within the tag schema, it outputs the corresponding tag identifiers for the identified tags. In the above example, the tag generator 216 may find a match for the label "minivan" in the tag schema, and outputs the corresponding tag identifier of 1002. Thus, the tag identifier 1002 represents the selected media item in this example.

In some implementations, the tag generator 216 may use a rules-based approach to determining tags. The tag generator 216 may maintain a mapping between different features and/or labels, and tags. In particular, the tag generator 216 may be loaded with rules defining how various labels and/or extracted features map to one or more particular tag. For example, a rule may map the label "vehicle" and the feature "car volume>60 cubic feet" to a tag identifier for "minivan." Another rule may map labels, such as "apples," "watermelon," and "banana," to a tag identifier for "fruits." In some implementations, the tag generator 216 may also use a model, e.g., a supervised or unsupervised machine learning or neural network model, to determine tags based on extracted features and/or labels. For example, a machine learning model may be trained using training data that correlates various features and/or labels, and tags. The tag generator 216 may input the extracted features and/or labels for a particular media item to this model, which in turn outputs the appropriate tag identifiers for the selected media item.

Although the above processing operations to generate a tag may be performed by the content manager 108 upon the user's selection of the mute button (or another interactive GUI component), tags may be generated for the media item by the content source 110 upon receiving and storing the media item. The processing operations for a content source 110 to generate tags for the media item are the same as described above with reference to the content manager 108.

The tag generator 216 then stores the tag identifiers for the selected media item. As depicted in FIG. 2, the tag generator 216 stores these tag identifiers in a data structure 252 of the tag store data storage device 218. In some implementations, more than one user may use an application, e.g., a browser, on the user device 102. In such instances, the data structure 252 may include separate entries (e.g., arrays) for each user of the application and the tag generator 216 in turn separately stores tag identifiers for each user in the corresponding entries of the data structure 252.

Different users of the application may be assigned different unique identifiers by the application. Before the tag generator 216 stores the tag identifiers in the data structure 252, it first determines the user identifier for the user using the application. The user may enter the user identifier, e.g., on a user interface displayed in the application, before the user begins using the application or while the user is using the application. When the user enters its user identifier, the content manager 108 may store this user identifier (e.g., in a cache or secure cookie) and provide it to the tag generator 216 prior to the tag generator 216 updating data structure 252. The tag generator 216 in turn uses this user identifier to find the corresponding entry in the data structure 252 to update with the tag identifiers.

In addition to storing the tag identifiers identified by the content analyzer 214, the tag generator 216 may also generate and store additional tag identifiers. In some implementations, if the user's prior mute requests as well as the present mute request 250 have resulted in an identification of all tags that descend from a parent tag, then the tag generator 216 may also store the parent tag. For example, if the data structure 252 stores tags for both the tags that directly descend from the parent tag of "Vehicle"—"SUV" and "Minivan"—then the tag generator 216 also generates and stores the "Vehicle" tag in the data structure 252.

After the tag generator 216 stores the tag identifiers in the data structure 252, the user may revisit the same content platform, Website A 204, or visit another content platform, Website B 230, on the user device 102. When the user accesses either content platform, a script on the content platform invokes an API for the browser (or the other application that the user was previously using) that fetches all the tag identifiers for the user stored in the data structure 252. Alternatively, the script can request that the content manager 108 obtain this information from the data structure 252.

In some implementations, the content manager 108 sends a content request message 256 to one or more content sources 110. The content request message 256 also includes the fetched tag identifiers, which serves to notify the content sources of the types of content that the user does not want to see.

In some implementations, it may be desirable, from a user privacy perspective, to not send the fetched tag identifiers in the content request message 256 that may identify a user. In such implementations, the tag identifiers that are sent in the content request message 252 are first anonymized using a privacy preserving aggregator engine. The privacy preserving aggregator engine may be implemented as a data processing apparatus (e.g., a server) that is separate from any content platform 106, user device 102, or content source 110. Alternatively, the privacy preserving aggregator engine may be implemented within each content platform 106, content source 110, or user device 102.

In some implementations, the privacy preserving aggregation engine performs the anonymization as follows. Each browser (or one or more other applications, or operating systems) executing on the user device 102 send the tags that it stores in its respective tag store 218 to the privacy preserving aggregator engine. Based on the received tag information from these browsers (or one or more other applications or operating systems), the privacy preserving aggregator engine generates an aggregate (i.e., computes a sum) for each particular tag in the tag hierarchy. The privacy preserving aggregator engine then transmits the aggregates for each particular tag (which will be referred to as a tag aggregate) to each user device 102, where this information may be stored along with the data structure that stores the tag identifiers and tag names (as shown in the third column of data structure 254). The content manager 108 only sends those tags in the content request message 256 for which the tag aggregate satisfies (e.g., meets or exceeds) a particular threshold. For a particular tag whose tag aggregate does not satisfy a particular threshold, the content manager evaluates whether another tag that is higher up in the hierarchy satisfies the particular threshold. Using the data structure 254 as an example, if a threshold is 3000, the content manager 108 determines that the "jeans" tag does not satisfy this threshold. However, the content manager 108 determines that the "apparel" tag, which is higher in the hierarchy that the "jeans" tag, exceeds this threshold. Accordingly, in the content request message 256, the content manager 108 does not include the tag identifier for "jeans" and instead, includes the tag identifier for "apparel."

In response to the content request message 256 (which includes one or more tag identifiers, as described above), and using the same tag schema, the content sources 110 provide content. The content source 110 provide content that are represented by tag identifiers other than the one or more tag identifiers included in the content request message 256. The content received from the content sources 110 may then be presented on Website B 230.

In some implementation, upon receiving content from the content sources 110, the content manager 108 may further analyze the received content to confirm that this content is represented by tags other than the tags included in the content request message 256. When the content received from the content sources 110 include tags (e.g., in the meta data of the content), the content manager 108 compares these tags with the tags included in the content request message 256. If the content manager 108 does not find a match based on this comparison, the content manager 108 presents the received content. However, if the content manager 108 finds a match based on this comparison, the content manager 108 does not present content whose tags are among the tags included in the content request message 256.

When the content received from the content sources 110 does not include any tags, the content manager 108 determines tags for the received content in the same manner as described above when determining tags for the selected media item. Upon determining these tags, the content manager 108 determines whether to present the received content based on a comparison of the tags determined for this content with the tags included in the content request message 256 (as described above)

Although the above-described implementations describe the content request message 256 as including tags (whether they are the fetched tags or tags that have been anonymized), it may be desirable, from a user data privacy perspective, to not provide any tags to any content source 110. In such scenarios, the content manager 108 does not include any tag identifiers in the content request message 256. The content sources 110 provide content to the user device 102, which may be intercepted by the content manager 108. As described above, the content manager 108 may determine the tags for the received content and then determine whether to present the received content based on a comparison of the tags with the fetched tag identifiers.

In any of the above implementations, when the content manager 108 receives content that is represented by one or more tags that are already associated with the user (i.e., tags representing content that the user has previously requested to remove, which are stored in data structure 252), the content manager 108 can prevent presentation of the content using one or more of the following operations: (1) insert a placeholder (e.g., a blank box with text stating "HIDDEN," as shown at 234 in FIG. 2) in place of the location where the content would otherwise be presented; (2) send a request for other content to the same content source 110 and present that content (upon evaluating that the subsequently received content is represented by tags other than the tags included in the content request message 256); (3) present the content, but prompt the user (e.g., using an interactive GUI component, such as a button) to confirm or deny continued presentation of the content; (4) block all future content from the content source 110 that sent the particular content, if the content source 110 sends, more than a threshold number of time, content that is represented by tags associated with the user/application; or (5) report a violation of the user's preferences to the provider of the application or the operating system.

The above-operations of the content manager 108 are implemented as an agent implemented in the browser (or other application, such as a native application) executing on the user device 102. Such an implementation enables filtering out all content presented within the browser (or other application) where the agent is deployed. In other implementations, the content manager 108 may be implemented in the operating system of the user device 102. Implementing the content manager 108 within the operating system prevents presentation of content across all applications that the user uses on the user device 102. In such implementations, when the user accesses a content platform using an application, e.g., a native application or a browser, and selects the mute button for a particular media item presented by a content platform 106, the software development kit (SDK) of the application invokes an operating system API to determine and store tags representing the selected media item (in the same manner described above). Subsequently, when the user accesses the same or different content platform 106, a script on the content platform 106 invokes an operating system API (or the script requests that the content manager 108) that performs all the same operations in the same manner as described above with respect to the agent running on the browser (or other application).

Figure 3:
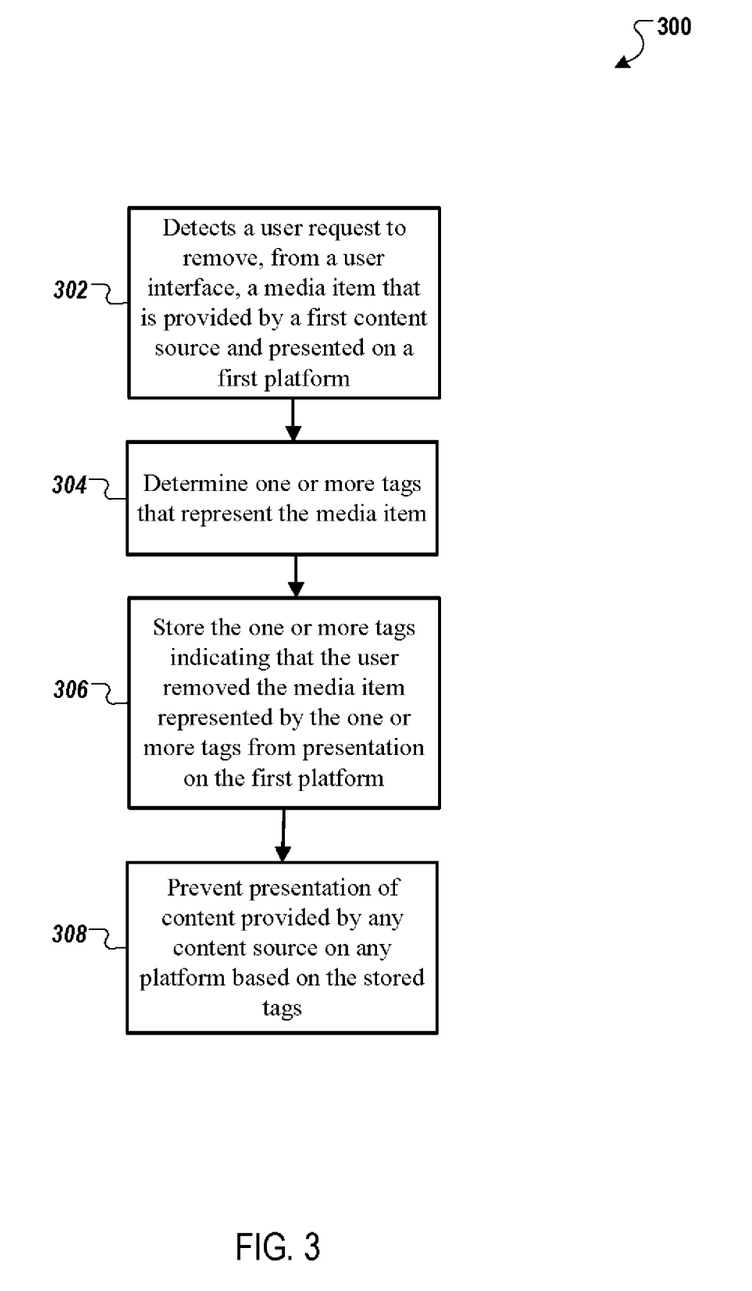
FIG. 3 is a flow diagram of an example process that prevents presentation of content across various different content sources.

FIG. 3 is a flow diagram of an example process 300 that prevents presentation of content based on user preferences. Operations of process 300 are described below as being performed by the components of the system described and depicted in FIGS. 1 and 2. Operations of the process 300 are described below for illustration purposes only. Operations of the process 300 can be performed by any appropriate device or system, e.g., any appropriate data processing apparatus. Operations of the process 300 can also be implemented as instructions stored on a non-transitory computer readable medium. Execution of the instructions cause one or more data processing apparatus to perform operations of the process 300.

The content manager 108 detects a request from a user to remove, from a user interface, a media item that is provided by a first content source and presented on a first platform (at 302), as described above with reference to FIG. 2.

The content analyzer 214 determines one or more tags that represent the media item (at 304). The content analyzer 214 determines the tags that represent the media item in three steps. First, the content analyzer 214 extracts features from the media item (as described above with reference to FIG. 2). Second, the content analyzer 214 processes the features to identify labels for the features (as described above with reference to FIG. 2). Third, the tag generator 216 identifies the one or more tags for the media item based on the labels (as described above with reference to FIG. 2).

The tag generator 216 stores, in a storage device (e.g., data structure 252 of tag store 218), the one or more tags indicating that the user removed the media item represented by the one or more tags from presentation on the first platform (at 306). This operation is described above with reference to FIG. 2.

The content manager 108 prevents presentation of content provided by any content source on any platform based on the stored tags (at 308). As described above with reference to FIG. 2, the content manager uses the tags stored in the storage device (e.g., data structure 252) to prevent presentation of content that are represented by one or more of these stored tags. Thus, as described above with reference to FIG. 2, whichever platform the user subsequently accesses on the user device 102 (i.e., the first content platform or another content platform), the content provided by the content sources 110 (i.e., the first content source or any other content source) on that platform will exclude content for which the tags represent one or more stored tags.

In some implementations, the content manager 108 evaluates whether to present content based on the stored tags using the following steps. First, the content manager 108 detects execution of a script on a content platform (which may be the same platform that the user previously accessed or a second platform that is different from the first platform) that requests content from a content source (e.g., a first content source which previously provided content that the user requested to mute or a second content source that is different from the first content source). This operation is described above with reference to FIG. 2. Alternatively, and as described above with reference to FIG. 2, upon executing, the script requests that the content manager 108 request content from the content source. Second, and after detecting execution of the script, the content manager 108 transmits a request to the content source to provide content other than content having the one or more tags that were stored as part of operation 206. This operation is described above with reference to FIG. 2. Third, and after transmitting the request to the content source, the content manager 108 receives content provided by the content source, as described above with reference to FIG. 2. Fourth, the content manager 108 determines whether the tags representing the content provided by the content source match the one or more tags that represent the media item. If the tags representing the content provided by the second content source do not match the one or more tags that represent the media item, then the content manager 108 allows presentation of the content provided by the content source. On the other hand, if the tags representing the content provided by the second content source match the one or more tags that represent the media item, then the content manager 108 may prevent presentation of the content and/or take one or more of the actions described above with reference to FIG. 2.

In some implementations, the content manager 108 may also block all subsequent content from a particular content source. For example, if a content source repeatedly sends (e.g., more than a threshold number of times, which may be referred to as a rejection threshold) content that is represented by one or more tags that match the tags associated with the user, the content manager 108 may block all subsequent content from that content source.

Figure 4:
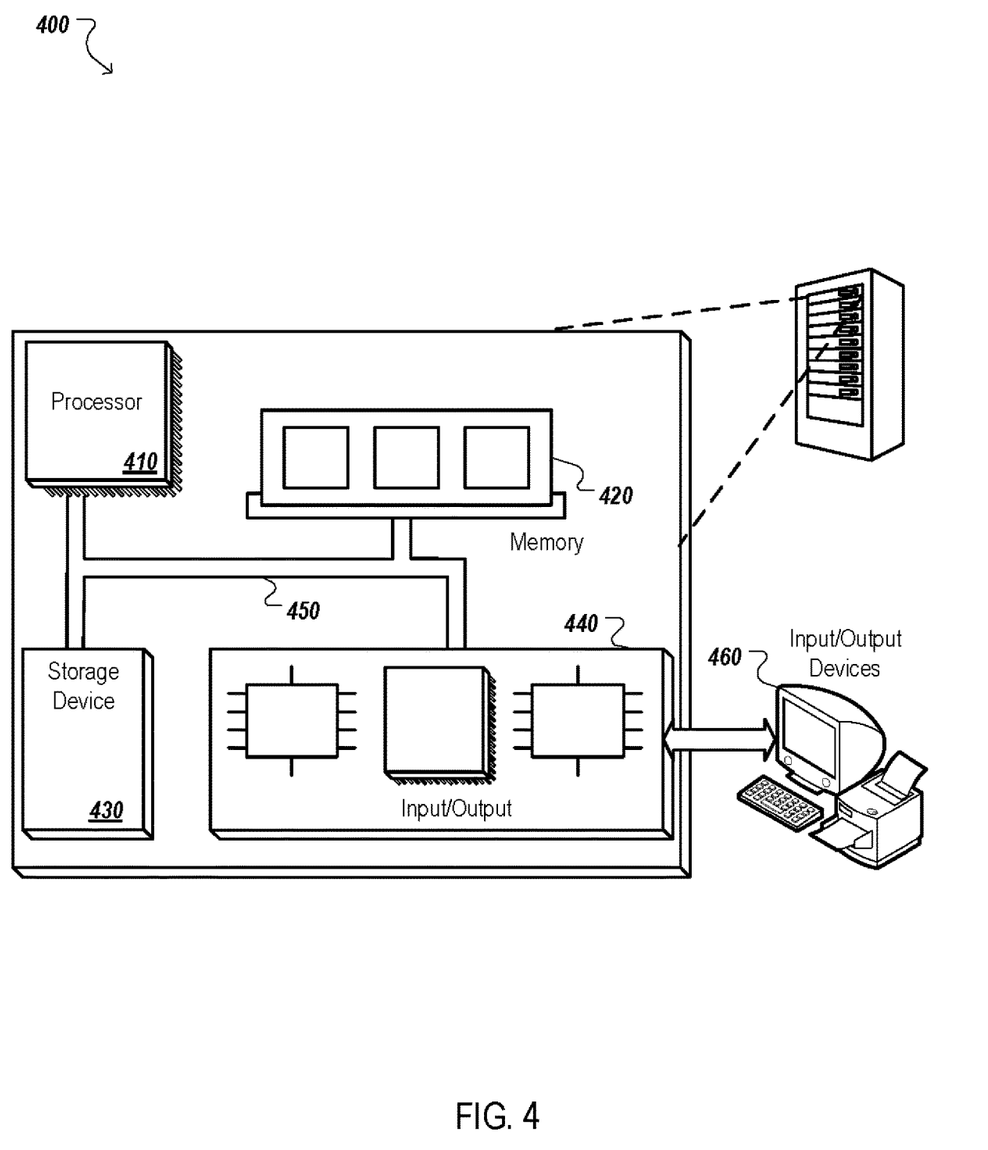
FIG. 4 is a block diagram of an example computer system.

FIG. 4 is block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In some implementations, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In some implementations, the memory 420 is a volatile memory unit. In another implementation, the memory 420 is a non-volatile memory unit.

The storage device 430 is capable of providing mass storage for the system 400. In some implementations, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In some implementations, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 460. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage media (or medium) for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer implemented method, comprising:
    receiving, by a first content source, a content request message including tag information collected by a browser executing at a client device that submitted the content request message;
    determining, based on the tag information, that (i) a media item was presented at the client device by a second content source, and that (ii) a user of the client device requested the media item be removed from presentation at the client device through interaction with a mute button; and
    preventing, by the first content source, presentation of content (i) from a second content source and (ii) having tags that match the tag information of the media item that the user requested be removed from presentation, wherein the second content source differs from the first content source.

2. The computer implemented method of claim 1, further comprising:
    extracting, from the media item, features of the media item; and
    processing the features to identify one or more tags that represent the media item from among tags listed in a reference hierarchical classification structure.

3. The computer implemented method of claim 2, wherein processing the features to identify one or more tags that represent the media item from among tags listed in a reference hierarchical classification structure, includes:
  generating labels to represent the media item based on the features of the media item; and
  identifying the one or more tags that represent the media item based on a comparison of the labels to tags listed in the reference hierarchical classification structure.

4. The computer implemented method of claim 3, further comprising:
  detecting execution of a script on a second content platform that requests content from the second content source;
  after detecting execution of the script, transmitting a request to the second content source to provide content other than content having the one or more tags, wherein the request includes the one or more tags; and
  after transmitting the request to the second content source, receiving content provided by the second content source.

5. The computer implemented method of claim 4, further comprising:
  confirming that tags representing the content provided by the second content source do not match the one or more tags that represent the media item; and
  allowing presentation of the content provided by the second content source after confirming that the tags representing the content provided by the second content source do not match the one or more tags that represent the media item.

6. The computer implemented method of claim 5, wherein confirming that tags representing the content provided by the second content source do not match the one or more tags that represent the media item, includes:
  extracting, from the content provided by the second content source, features related to the content provided by the content source;
  processing the features to identify one or more tags for the content provided by the second content source from among tags listed in a reference hierarchical classification structure; and
  determining that the one or more tags for the content provided by the second content source does not match the one or more tags that represent the media item.

7. The computer implemented method of claim 6, further comprising:
  determining a number of instances when a data processing apparatus prevented presentation of the content provided by the second content source;
  determining that the number of instances satisfies a rejection threshold; and
  in response to determining that the number of instances satisfies the rejection threshold, preventing presentation of any content provided by the second content source.

8. A system, comprising:
  one or more memory devices storing instructions; and
  one or more data processing apparatus of a first content source that are configured to interact with the one or more memory devices, and upon execution of the instructions, perform operations including:
    receiving, by the first content source, a content request message including tag information collected by a browser executing at a client device that submitted the content request message;
    determining, based on the tag information, that (i) a media item was presented at the client device by a second content source, and that (ii) a user of the client device requested the media item be removed from presentation at the client device through interaction with a mute button; and
    preventing, by the first content source, presentation of content (i) from a second content source and (ii) having tags that match the tag information of the media item that the user requested be removed from presentation, wherein the second content source differs from the first content source.

9. The system of claim 8, wherein the instructions cause the one or more data processing apparatus to perform operations further comprising:
  extracting, from the media item, features of the media item; and
  processing the features to identify one or more tags that represent the media item from among tags listed in a reference hierarchical classification structure.

10. The system of claim 9, wherein processing the features to identify one or more tags that represent the media item from among tags listed in a reference hierarchical classification structure, includes:
  generating labels to represent the media item based on the features of the media item; and
  identifying the one or more tags that represent the media item based on a comparison of the labels to tags listed in the reference hierarchical classification structure.

11. The system of claim 10, wherein the instructions cause the one or more data processing apparatus to perform operations further comprising:
  detecting execution of a script on a second content platform that requests content from the second content source;
  after detecting execution of the script, transmitting a request to the second content source to provide content other than content having the one or more tags, wherein the request includes the one or more tags; and
  after transmitting the request to the second content source, receiving content provided by the second content source.

12. The system of claim 11, wherein the instructions cause the one or more data processing apparatus to perform operations further comprising:
  confirming that tags representing the content provided by the second content source do not match the one or more tags that represent the media item; and
  allowing presentation of the content provided by the second content source after confirming that the tags representing the content provided by the second content source do not match the one or more tags that represent the media item.

13. The system of claim 12, wherein confirming that tags representing the content provided by the second content source do not match the one or more tags that represent the media item, includes:
  extracting, from the content provided by the second content source, features related to the content provided by the content source;
  processing the features to identify one or more tags for the content provided by the second content source from among tags listed in a reference hierarchical classification structure; and
  determining that the one or more tags for the content provided by the second content source does not match the one or more tags that represent the media item.

14. The system of claim 13, wherein the instructions cause the one or more data processing apparatus to perform operations further comprising:

determining a number of instances when a data processing apparatus prevented presentation of the content provided by the second content source;

determining that the number of instances satisfies a rejection threshold; and in response to determining that the number of instances satisfies the rejection threshold, preventing presentation of any content provided by the second content source.

15. A non-transitory computer readable medium storing instructions that, when executed by one or more data processing apparatus of a first content source, cause the one or more data processing apparatus to perform operations comprising:

receiving, by the first content source, a content request message including tag information collected by a browser executing at a client device that submitted the content request message;

determining, based on the tag information, that (i) a media item was presented at the client device by a second content source, and that (ii) a user of the client device requested the media item be removed from presentation at the client device through interaction with a mute button; and preventing, by the first content source, presentation of content (i) from a second content source and (ii) having tags that match the tag information of the media item that the user requested be removed from presentation, wherein the second content source differs from the first content source.

16. The non-transitory computer readable medium of claim 15, wherein the instructions cause the one or more data processing apparatus to perform operations further comprising:

extracting, from the media item, features of the media item; and processing the features to identify one or more tags that represent the media item from among tags listed in a reference hierarchical classification structure.

17. The non-transitory computer readable medium of claim 16, wherein processing the features to identify one or more tags that represent the media item from among tags listed in a reference hierarchical classification structure, includes:

generating labels to represent the media item based on the features of the media item; and identifying the one or more tags that represent the media item based on a comparison of the labels to tags listed in the reference hierarchical classification structure.

18. The non-transitory computer readable medium of claim 17, wherein the instructions cause the one or more data processing apparatus to perform operations further comprising:

detecting execution of a script on a second content platform that requests content from the second content source;

after detecting execution of the script, transmitting a request to the second content source to provide content other than content having the one or more tags, wherein the request includes the one or more tags; and after transmitting the request to the second content source, receiving content provided by the second content source.

19. The non-transitory computer readable medium of claim 18, wherein the instructions cause the one or more data processing apparatus to perform operations further comprising:

confirming that tags representing the content provided by the second content source do not match the one or more tags that represent the media item; and allowing presentation of the content provided by the second content source after confirming that the tags representing the content provided by the second content source do not match the one or more tags that represent the media item.

20. The non-transitory computer readable medium of claim 19, wherein confirming that tags representing the content provided by the second content source do not match the one or more tags that represent the media item, includes:

extracting, from the content provided by the second content source, features related to the content provided by the content source;

processing the features to identify one or more tags for the content provided by the second content source from among tags listed in a reference hierarchical classification structure; and determining that the one or more tags for the content provided by the second content source does not match the one or more tags that represent the media item.

* * * * *